(12) United States Patent
Kwon et al.

(10) Patent No.: US 12,725,824 B2
(45) Date of Patent: Sep. 1, 2026

(54) UNIT CELL PREPARATION APPARATUS AND METHOD

(71) Applicant: LG Energy Solution, Ltd., Seoul (KR)

(72) Inventors: Soon Kwan Kwon, Daejeon (KR); Su Taek Jung, Daejeon (KR); Sang Ho Bae, Daejeon (KR); Byeong Kyu Lee, Daejeon (KR); Tai Jin Jung, Daejeon (KR); Seong Won Choi, Daejeon (KR); Ju Hyeon Cho, Daejeon (KR); Yong Jun Lee, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 872 days.

(21) Appl. No.: 17/913,044

(22) PCT Filed: Mar. 25, 2021

(86) PCT No.: PCT/KR2021/003723
§ 371 (c)(1),
(2) Date: Sep. 21, 2022

(87) PCT Pub. No.: WO2021/194282
PCT Pub. Date: Sep. 30, 2021

(65) Prior Publication Data

US 2023/0369630 A1 Nov. 16, 2023

(30) Foreign Application Priority Data

Mar. 25, 2020 (KR) ........................ 10-2020-0036393
Jan. 21, 2021 (KR) ........................ 10-2021-0008932

(51) Int. Cl.
*H01M 10/04* (2006.01)
*H01M 10/42* (2006.01)
(Continued)

(52) U.S. Cl.
CPC ... *H01M 10/0404* (2013.01); *H01M 10/4235* (2013.01); *H01M 50/449* (2021.01);
(Continued)

(58) Field of Classification Search
CPC ........... H01M 10/0404; H01M 50/461; H01M 50/449; H01M 10/4235; Y02P 70/50; Y02E 60/10
See application file for complete search history.

(56) References Cited

U.S. PATENT DOCUMENTS 5,531,233 A 7/1996 Oglesby et al.
2001/0049872 A1 12/2001 Hong
(Continued)

FOREIGN PATENT DOCUMENTS

CN 1328354 A 12/2001
CN 1466425 A 1/2004
(Continued)

OTHER PUBLICATIONS

Extended European Search Report including Written Opinion for Application No. 21775511.5 dated Jul. 1, 2024, pp. 1-11.
(Continued)

*Primary Examiner* — Maria Laios
*Assistant Examiner* — Lawrence La Raia, III
(74) *Attorney, Agent, or Firm* — Lerner David LLP

(57) ABSTRACT

An apparatus for preparing a unit cell is provided. The apparatus includes a center electrode reel from which a center electrode sheet is unwound, wherein the center electrode sheet is configured to form a plurality of center electrodes, separator reels from which separator sheets to be stacked with the center electrodes are unwound, a laminator configured to laminate a stack which is formed by stacking the plurality of center electrodes with the separator sheets while the plurality of center electrodes are spaced apart from
(Continued)

each other and disposed in a row in a longitudinal direction of the separator sheets, a first nozzle configured to apply an adhesive to an upper surface of the separator sheet disposed on an uppermost layer of the laminated stack, and an upper electrode reel from which an upper electrode sheet is unwound.

31 Claims, 13 Drawing Sheets

(51) Int. Cl.
*H01M 50/449* (2021.01)
*H01M 50/46* (2021.01)

(52) U.S. Cl.
CPC .......... *H01M 50/461* (2021.01); *Y02E 60/10* (2013.01); *Y02P 70/50* (2015.11)

(56) References Cited

U.S. PATENT DOCUMENTS

2003/0173418 A1 9/2003 Koborinai et al.
2006/0085972 A1 4/2006 Sudano et al.
2008/0008923 A1* 1/2008 Numao ................ H01M 8/028 429/510
2013/0260208 A1 10/2013 Cho et al.
2013/0260211 A1 10/2013 Min et al.
2015/0064547 A1 3/2015 Ahn et al.
2016/0164060 A1 6/2016 Zhang et al.
2019/0027777 A1 1/2019 Lee et al.
2019/0363389 A1 11/2019 Ko et al.
2020/0136189 A1 4/2020 Yamashita et al.
2020/0259212 A1* 8/2020 Visco .................... G01N 21/31
2021/0344048 A1* 11/2021 Sato .................... H01M 50/461
2022/0200038 A1 6/2022 Bae et al.
2023/0097190 A1* 3/2023 Kitazawa ................ B32B 41/00 429/247

FOREIGN PATENT DOCUMENTS

CN 108604702 A 9/2018
CN 110199424 A 9/2019
CN 113632274 A 11/2021
EP 2866290 A1 4/2015
GB 1089532 A 11/1967
JP 4025930 B2 12/2007
JP 2009009919 A 1/2009
JP 2012074402 A 4/2012
JP 2012160352 A 8/2012
JP 2013544430 A 12/2013
JP 2017536677 A 12/2017
KR 20120060325 A 6/2012
KR 20120060700 A 6/2012
KR 20140022620 A 2/2014
KR 20150049576 A 5/2015
KR 20150066711 A 6/2015
KR 20160050718 A 5/2016
KR 101763993 B1 8/2017
KR 20180039561 A 4/2018
KR 20180116907 A 10/2018
KR 20190045602 A 5/2019
KR 20190059676 A 5/2019
WO 2020054801 A1 3/2020

OTHER PUBLICATIONS

International Search Report for Application No. PCT/KR2021/003723 mailed Jul. 6, 2021, pp. 1-2.

* cited by examiner

1211

1221

UNIT CELL PREPARATION APPARATUS AND METHOD

CROSS-REFERENCE TO RELATED APPLICATIONS

This application is a national stage entry under 35 U.S.C. § 371 of International Application No. PCT/KR2021/003723 filed on Mar. 25, 2021, which claims priority from Korean Patent Application Nos. 10-2020-0036393, filed on Mar. 25, 2020, and 10-2021-0008932, filed on Jan. 21, 2021, the disclosures of which are incorporated by reference herein.

TECHNICAL FIELD

The present invention relates to unit cell preparation apparatus and method, and more particularly, to unit cell preparation apparatus and method which may prevent a displacement in position of an upper electrode when the upper electrode is stacked on a stack that is formed by stacking a center electrode and a separator.

BACKGROUND ART

In general, types of secondary batteries include a nickel cadmium battery, a nickel hydride battery, a lithium ion battery, and a lithium ion polymer battery. These secondary batteries are not only applied and used in small products such as digital cameras, P-DVDs, MP3Ps, mobile phones, PDAs, portable game devices, power tools, and E-bikes, but are also applied and used in large products requiring high output, such as electric vehicles and hybrid vehicles, and a power storage device and a power storage device for backup which store surplus generated power or renewable energy.

In order to prepare such a secondary battery, first, a positive electrode collector and a negative electrode collector are respectively coated with electrode active material slurries to prepare a positive electrode and a negative electrode, and the positive electrode and the negative electrode are then stacked on both sides of a separator to form an electrode assembly having a predetermined shape. Then, after the electrode assembly is accommodated in a battery case and an electrolyte solution is injected, the battery case is sealed.

The electrode assembly is classified into various types. For example, there are a simple stack type in which a unit cell is not prepared and positive electrodes, separators, and negative electrodes are simply crossed and continuously stacked, a lamination & stack type (L&S) in which a unit cell is first prepared using a positive electrode, a separator, and a negative electrode and these unit cells are then stacked, a stack & folding type (S&F) in which a plurality of electrodes or unit cells are spaced apart and attached to one surface of a separator sheet having a greater length in one side and the separator sheet is repeatedly folded in the same direction from one end, and a Z-folding type that alternatingly repeats a process in which a plurality of electrodes or unit cells are alternatingly attached to one surface and the other surface of a separator sheet having a greater length in one side and the separator sheet is folded in a specific direction from one end and then folded in an opposite direction.

Among them, in order to prepare the lamination & stack type (L&S) electrode assembly, first, a unit cell must be prepared. In general, in order to prepare the unit cell, separators are respectively stacked on upper and lower surfaces of a center electrode while the center electrode is moved to one side by a conveyor belt or the like, and thereafter, an upper electrode is further stacked on an uppermost end. In addition, in some cases, a lower electrode may be further stacked on a lowermost end. Then, a laminating process is performed in which heat and pressure are applied to a stack in which the electrodes and the separators are stacked. Since the laminating process is performed, the electrodes and the separators may be bonded together to firmly form a unit cell.

However, typically, the laminating process was performed after the lower separator, the center electrode, the upper separator, and the upper electrode were all stacked. Accordingly, since an overall thickness was large, heat was not transferred to the inside of the stack, and thus, there was a problem in that adhesion was reduced. Particularly, the adhesion was reduced at an interface between the innermost center electrode and the upper separator, and, accordingly, since the electrode and the separator were not adhered to each other, there was a problem in that the electrode was out of position.

[Prior Art Documents] Korean Patent Application Laid-Open Publication No. 2014-0022620

DISCLOSURE OF THE INVENTION

Technical Problem

An aspect of the present invention provides unit cell preparation apparatus and method which may prevent a displacement in position of an upper electrode when the upper electrode is stacked on a stack that is formed by stacking a center electrode and separator sheets.

The object of the present invention is not limited to the aforesaid, but other objects not described herein will be clearly understood by those skilled in the art from descriptions below.

Technical Solution

According to an aspect of the present invention, there is provided an apparatus for preparing a unit cell which includes: a center electrode reel from which a center electrode sheet, which is to be a plurality of center electrodes, is unwound; separator reels from which separator sheets to be stacked with the center electrodes are unwound; a laminator for laminating a stack which is formed by stacking the plurality of center electrodes with the separator sheets while the plurality of center electrodes are spaced apart from each other and disposed in a row in a longitudinal direction of the separator sheets; a first nozzle for applying an adhesive to an upper surface of the separator sheet disposed on an uppermost layer of the stack; and an upper electrode reel from which an upper electrode sheet, which is to be a plurality of upper electrodes to be stacked on an upper surface of the stack to which the adhesive has been applied, is unwound.

Also, the apparatus for preparing a unit cell may further include a first vision sensor disposed above the center electrode to photograph the center electrode before the center electrodes are stacked with the separator sheets.

Furthermore, the apparatus for preparing a unit cell may further include a second vision sensor disposed above the upper electrode to photograph the upper electrode before the upper electrode is stacked with the stack.

Also, the laminator may include a heating roller for applying heat and pressure to the stack while rotating.

Furthermore, the laminator may further include a heater for applying heat and pressure to an entire surface of the stack.

Also, the separator reels may include an upper separator reel from which an upper separator sheet to be stacked on an upper surface of the center electrode is unwound; and a lower separator reel from which a lower separator sheet to be stacked on a lower surface of the center electrode is unwound.

Furthermore, the apparatus for preparing a unit cell may further include a lower electrode reel from which a lower electrode sheet, which is to be a plurality of lower electrodes to be stacked on a lower surface of the stack, is unwound.

Also, the apparatus for preparing a unit cell may further include a second nozzle for applying an adhesive to an upper surface of the lower electrode.

Furthermore, the apparatus for preparing a unit cell may further include a third vision sensor disposed above the lower electrode to photograph the lower electrode before the lower electrode is stacked with the stack.

Also, the apparatus for preparing a unit cell may further include nip rollers which apply pressure to the upper electrode and the stack while rotating when the upper electrode is stacked with the stack.

Furthermore, the first nozzle may be provided in plurality spaced apart from each other in a width direction of the separator sheets.

Also, at least one of spraying cycle, spraying area, and spraying amount of the adhesive may be different from each other with respect to the plurality of first nozzles.

Furthermore, the upper separator sheet may include a first base material layer; and a first coating layer coated on an upper surface of the first base material layer and bonded to the upper electrode while the adhesive is applied. The lower separator sheet may include a second base material layer; and a second coating layer coated on an upper surface of the second base material layer and bonded to the center electrode. A binder content of the first coating layer may be lower than a binder content of the second coating layer.

Also, the binder content of the first coating layer may be in a range of 2 wt % to 3 wt %.

Furthermore, the second coating layer may have the binder content of 10 wt % to 20 wt % and may be a safety reinforced separator (SRS) coating layer.

Also, the upper separator sheet may include a first base material layer bonded to the upper electrode while the adhesive is applied. The lower separator sheet may include a second base material layer; and a coating layer coated on an upper surface of the second base material layer and bonded to the center electrode.

According to another aspect of the present invention, there is provided a method of preparing a unit cell which includes: cutting a center electrode sheet unwound from a center electrode reel to form a plurality of center electrodes; forming a stack by stacking the plurality of center electrodes on separator sheets unwound from separator reels while the plurality of center electrodes are spaced apart from each other and disposed in a row in a longitudinal direction of the separator sheets; laminating the stack with a laminator; applying an adhesive by a first nozzle on an upper surface of the separator sheet disposed on an uppermost layer of the stack;

cutting an upper electrode sheet unwound from an upper electrode reel to form a plurality of upper electrodes; and stacking the plurality of upper electrodes on an upper surface of the stack to which the adhesive has been applied.

Also, the method may further include photographing the center electrode with a first vision sensor disposed above the center electrode, before the forming of the stack.

Furthermore, the method may further include photographing the upper electrode with a second vision sensor disposed above the upper electrode, before the stacking of the upper electrode.

Also, the stacking of the upper electrode may stack the plurality of upper electrodes on the upper surface of the stack while the plurality of upper electrodes are spaced apart from each other and disposed in a raw in a length direction of the separator sheet.

Furthermore, the laminating may include applying heat and pressure to the stack by a heating roller while the heating roller rotates.

Also, the laminating may further include applying heat and pressure to an entire surface of the stack by a heater, before the heating roller applies the heat and the pressure.

Furthermore, when the forming of the upper electrode is performed, forming a plurality of lower electrodes by cutting a lower electrode sheet unwound from a lower electrode reel may also be performed, and, when the stacking of the upper electrode is performed, stacking the plurality of lower electrodes on a lower surface of the stack may also be performed.

Also, when the applying of the adhesive on the upper surface of the stack is performed, applying an adhesive on an upper surface of the lower electrode by a second nozzle may also be performed.

Furthermore, in the applying of the adhesive on the upper surface of the stack, a region to which the adhesive is applied may correspond to at least a portion of an edge of the upper electrode.

Also, in the applying of the adhesive on the upper surface of the stack, a region to which the adhesive is applied may include regions corresponding to four vertices of the upper electrode.

Furthermore, in the applying of the adhesive on the upper surface of the stack, a region to which the adhesive is applied may form a plurality of rows parallel to a movement direction of the stack.

Also, a spacing between the regions to which the adhesive is applied in one row may be smaller than a spacing between the regions to which the adhesive is applied in another row.

Furthermore, a size of each region to which the adhesive is applied in one row may be smaller than a size of each region to which the adhesive is applied in another row.

Also, the one row may be located outer side than the another row with respect to a width direction of the stack.

Furthermore, the one row may correspond to an electrode tab of the upper electrode.

Other specific details of the present invention are included in the detailed description and drawings.

Advantageous Effects

According to the embodiments of the present invention, at least the following effects may be achieved.

Since a laminating process is first performed on a stack, which is formed by stacking a center electrode and a separator, and an upper electrode is then stacked, heat is transferred to the inside of the stack during the laminating process, and thus, a problem of reducing adhesion between the electrode and the separator may be prevented.

Also, since the upper electrode is stacked after an adhesive is applied on an upper surface of the stack subjected to the laminating process, a displacement in position of the upper electrode may be prevented.

The effects according to the present invention are not limited to the contents as exemplified above, but more various effects are included in the specification.

DETAILED DESCRIPTION

Figure 1:
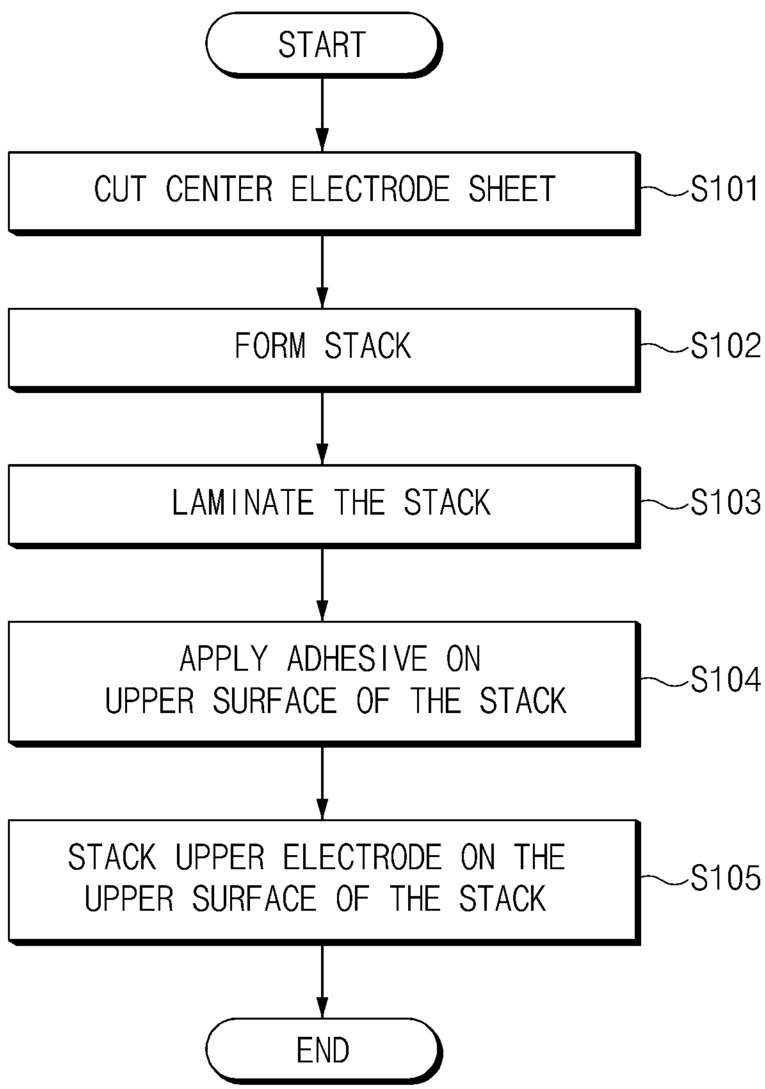
FIG. 1 is a flowchart of a method of preparing a unit cell according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless defined otherwise, all terms (including technical and scientific terms) used herein may be intended to have meanings understood by those skilled in the art. In addition, terms defined in general dictionaries should not be interpreted abnormally or exaggeratedly, unless clearly specifically defined.

The terminology used herein is for the purpose of describing particular example embodiments only and is not intended to be limiting of the present invention. In the specification, the terms of a singular form may include plural forms unless referred to the contrary. It will be further understood that the terms "comprises" and/or "comprising" when used in this specification, specify the presence of stated components, but do not preclude the presence or addition of one or more other components.

Hereinafter, preferred embodiments of the present invention will be described in detail with reference to the accompanying drawings.

FIG. 1 is a flowchart of a method of preparing a unit cell according to an embodiment of the present invention.

According to an embodiment of the present invention, since a laminating process is first performed on a stack 20, which is formed by stacking a center electrode 1112 and a separator 12, and an upper electrode 1122 is then stacked, heat is transferred to the inside of the stack 20 during the laminating process, and thus, a problem of reducing adhesion between an electrode 11 and the separator 12 may be prevented. Also, since the upper electrode 1122 is stacked after an adhesive is applied on an upper surface of the stack 20 subjected to the laminating process, a displacement in position of the upper electrode 1122 may be prevented.

For this purpose, the method of preparing a unit cell according to the embodiment of the present invention includes the steps of: cutting a center electrode sheet 1111 unwound from a center electrode reel 111 to form a plurality of center electrodes 1112 (S101); forming a stack 20 by stacking the plurality of center electrodes 1112 on separator sheets 1211 and 1221 unwound from separator reels 121 and 122 while the plurality of center electrodes 1112 are spaced apart from each other and disposed in a row in a longitudinal direction of the separator sheets 1211 and 1221 (S102); laminating the stack 20 with a laminator (S103); applying an adhesive by a first nozzle 14 on an upper surface of the separator sheet 1211 and 1221 disposed on an uppermost layer of the stack 20 (S104); cutting an upper electrode sheet 1121 unwound from an upper electrode reel 112 to form a plurality of upper electrodes 1122; and stacking the plurality of upper electrodes 1122 on an upper surface of the stack 20 to which the adhesive has been applied (S105).

Hereinafter, each step illustrated in the flowchart of FIG. 1 will be described in detail with reference to FIGS. 2 and 3.

Figure 2:
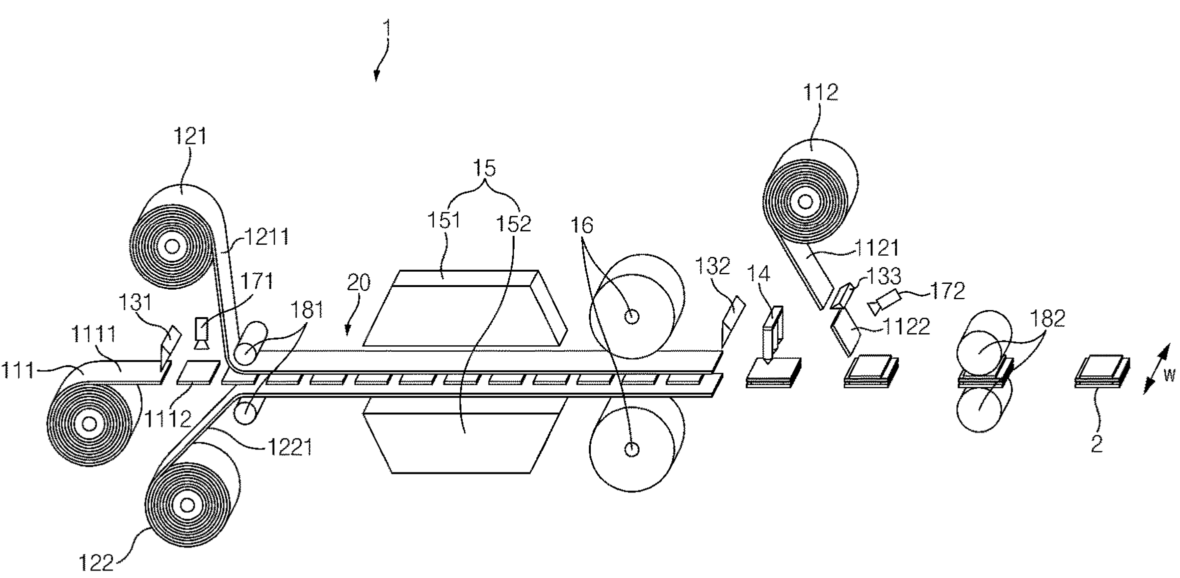
FIG. 2 is a schematic view of an apparatus for preparing a unit cell according to an embodiment of the present invention.

FIG. 2 is a schematic view of an apparatus 1 for preparing a unit cell according to an embodiment of the present invention.

As illustrated in FIG. 2, the apparatus 1 for preparing a unit cell according to the embodiment of the present invention may include a center electrode reel 111 from which a center electrode sheet 1111, which is to be a plurality of center electrodes 1112, is unwound; separator reels 121 and 122 from which separator sheets 1211 and 1221 to be stacked with the center electrode 1112 are unwound; a laminator for laminating a stack 20 which is formed by stacking the plurality of center electrodes 1112 with the separator sheets 1211 and 1221 while the plurality of center electrodes 1112 are spaced apart from each other and disposed in a row in a longitudinal direction of the separator sheets 1211 and 1221; a first nozzle 14 for applying an adhesive to an upper surface of the separator sheet 1211 and 1221 disposed on an uppermost layer of the laminated stack 20; and an upper electrode reel 112 from which an upper electrode sheet 1121, which is to be a plurality of upper electrodes 1122 to be stacked on an upper surface of the stack 20 to which the adhesive has been applied, is unwound. In addition, the separator reels 121 and 122 may include an upper separator reel 121 from which an upper separator sheet 1211 to be stacked on an upper surface of the center electrode 1112 is unwound; and a lower separator reel 122 from which a lower separator sheet 1221 to be stacked on a lower surface of the center electrode 1112 is unwound.

The center electrode reel 111 is a reel on which the center electrode sheet 1111 is wound, and the center electrode sheet 1111 is unwound from the center electrode reel 111. Then, the center electrode sheet 1111 is cut to form the center electrode 1112. The electrode sheets 1111 and 1121 may be prepared by coating a slurry of an electrode active material, a conductive agent, and a binder on an electrode collector, drying, and then pressing the coated electrode collector.

The upper separator reel 121 and the lower separator reel 122 are reels on which the separator sheets 1211 and 1221 are wound. In addition, the upper separator sheet 1211 unwound from the upper separator reel 121 is stacked on the upper surface of the central electrode 1112 which is formed by cutting the center electrode sheet 1111, and the lower separator sheet 1221 unwound from the lower separator reel 122 is stacked on the lower surface of the center electrode 1112. As a result, the stack 20 is formed in which the lower separator sheet 1221, the center electrode 1112, and the upper separator sheet 1211 are sequentially stacked. The stack 20 is formed by stacking the plurality of center electrodes 1112 on the separator sheets 1211 and 1221 while the plurality of center electrodes 1112 are spaced apart from each other and disposed in a row in a longitudinal direction of the separator sheets 1211 and 1221.

The laminator laminates an entire surface of the stack which is formed by stacking the center electrode 1112 and the separator 12. The expression "laminating" refers to bonding the center electrode 1112 and the separator 12 by applying heat and pressure to the stack 20. As illustrated in FIG. 2, the laminator may include a heater 15 for applying heat and pressure to the entire surface of the stack 20 and a heating roller 16 for applying pressure to the stack 20 while rotating.

The heater 15 is composed of an upper heater 151 and a lower heater 152, wherein the upper heater 151 and the lower heater 152 each may apply heat and pressure to the entire surface of upper and lower surfaces of the stack 20. In the heater 15, surfaces in contact with the stack 20, that is, a lower surface of the upper heater 151 and an upper surface of the lower heater 152 may be formed substantially flat. Thus, heat and pressure may be uniformly applied to the entire surface of the stack 20.

After the heater 15 applies heat and pressure to the stack 20, the heating roller 16 may apply heat and pressure to the stack 20 while rotating. In general, the heating roller 16, which applies pressure while rotating, applies a higher pressure than the heater 15 that simply applies pressure with a flat surface. Thus, after the heater 15 applies heat and pressure to the stack 20, the heating roller 16 applies heat and pressure greater than those of the heater 15 to the stack so that the heat and pressure applied to the stack (20) may be increased step by step. That is, the stack 20 may be laminated more strongly while preventing the inside of the stack 20 from being damaged due to rapid changes in temperature and pressure.

The nozzle 14 applies an adhesive to the upper surface of the laminated stack 20. In this case, since the upper separator sheet 1211 is stacked on the uppermost layer of the stack 20, the adhesive is applied to an upper surface of the upper separator sheet 1211.

The nozzles 14 may be provided in plurality spaced apart from each other along a width direction of the separator sheets 1211 and 1221. Accordingly, the adhesive may be simultaneously applied to different regions of the upper surface of the upper separator sheet 1211. Thus, an adhesive application operation by the nozzle 14 may be quickly performed.

For example, some of the plurality of nozzles 14 may apply the adhesive near both edges in a width direction of the upper separator sheet 1211, and the others thereof may apply the adhesive near a center of the upper separator sheet 1211.

A spraying speed, spraying amount, or spraying area of the adhesive sprayed from the plurality of nozzles 14 may be individually adjusted. With respect to the plurality of first nozzles 14, at least one of spraying cycle, spraying area, and spraying amount of the adhesive may be adjusted to be different from each another.

It is desirable that the adhesive is uniformly applied to the upper surface of the stack 20. However, if the adhesive is applied to an entire surface of the upper surface of the stack 20, an amount of the adhesive applied may be excessively large. Accordingly, the adhesive may flow to the outside of the stack 20 to contaminate other parts, and a function of generating power may not be smooth when a secondary battery is prepared. Thus, the adhesive may be applied to the upper surface of the stack 20 by a spot application method of applying the adhesive in the form of a dot or a line application method of applying the adhesive in the form of a line.

In contrast, if the amount of the adhesive applied is excessively small, the upper electrode 1122 is still not fixed to the stack 20 while the stack 20 is moved, and the upper electrode 1122 may be out of position. Thus, it is desirable that a spacing between regions to which the adhesive is applied is not excessively large.

The adhesive must maintain adhesiveness even if the separator 12 is impregnated with an electrolyte solution. Thus, it is desirable that the adhesive has a property of corrosion resistance that is not modified by chemical causes. Such an adhesive is a hot melt adhesive, wherein the adhesive may include a modified olefin-based thermoplastic resin.

The upper electrode reel 112 is a reel on which the upper electrode sheet 1121 is wound, and the upper electrode sheet 1121 is unwound from the upper electrode reel 112. The upper electrode sheet 1121 is cut to form a plurality of upper electrodes 1122, and the plurality of upper electrodes 1122 are stacked on the upper surface of the stack 20 to which the adhesive is applied. In this case, the plurality of upper electrodes 1122 may be stacked on the upper surface of the stack 20 while being spaced apart from each other and disposed in a row in the longitudinal direction of the separator sheets 1211 and 1221. Since the upper electrode 1122 and the center electrode 1112 have different sizes, spaced-apart spacings may be different. However, it is desirable that both the upper electrode 1122 and the center electrode 1112 are aligned and disposed so that their centers coincide.

The method of preparing a unit cell according to the embodiment of the present invention may be performed as follows, using the apparatus 1 for preparing a unit cell as described above.

As illustrated in FIG. 2, when the center electrode sheet 1111 is first unwound from the center electrode reel 111, a first cutter 131 cuts the center electrode sheet 1111 (S101). Then, the plurality of center electrodes 1112 are formed. The upper separator sheet 1211 is unwound from the upper separator reel 121 and stacked on the upper surface of the center electrode 1112, and the lower separator sheet 1221 is unwound from the lower separator reel 122 and stacked on the lower surface of the center electrode 1112 to form the stack 20 (S102). In this case, in order for the lower separator sheet 1221, the center electrode 1112, and the upper separator sheet 1211 to be easily and strongly adhered to one another, first nip rolls 181 may be disposed on both sides of the stack 20, respectively, and may apply pressure to the stack 20 while rotating.

After forming the stack 20, the laminator laminates the stack 20 (S103). As described above, the laminator includes the heater 15 and the heating roller 16, and, when laminating, after the heater 15 applies heat and pressure to the entire surface of the stack 20, the heating roller 16 may apply heat and pressure to the stack 20 while rotating.

When the laminating process is completed, a second cutter 132 cuts the stack 20 at a predetermined interval, and the nozzle 14 applies an adhesive to the upper surface of the cut stack 20 (S104). When the upper electrode sheet 1121 is unwound from the upper electrode reel 112, a third cutter 133 cuts the upper electrode sheet 1121 to form the upper electrode 1122. In addition, the upper electrode 1122 is stacked on the upper surface of the stack 20 to which the adhesive has been applied (S105). As a result, a unit cell 2 is prepared in which the lower separator sheet 1221, the center electrode 1112, the upper separator sheet 1211, and the upper electrode 1122 are sequentially stacked. In this case, in order for the upper electrode 1122 and the stack 20 to be easily and strongly adhered to each other, second nip rolls 182 may be disposed on both sides of the upper electrode 1122 and the stack 20, respectively, and may apply pressure to the upper electrode 1122 and the stack 20 while rotating.

Figure 3:
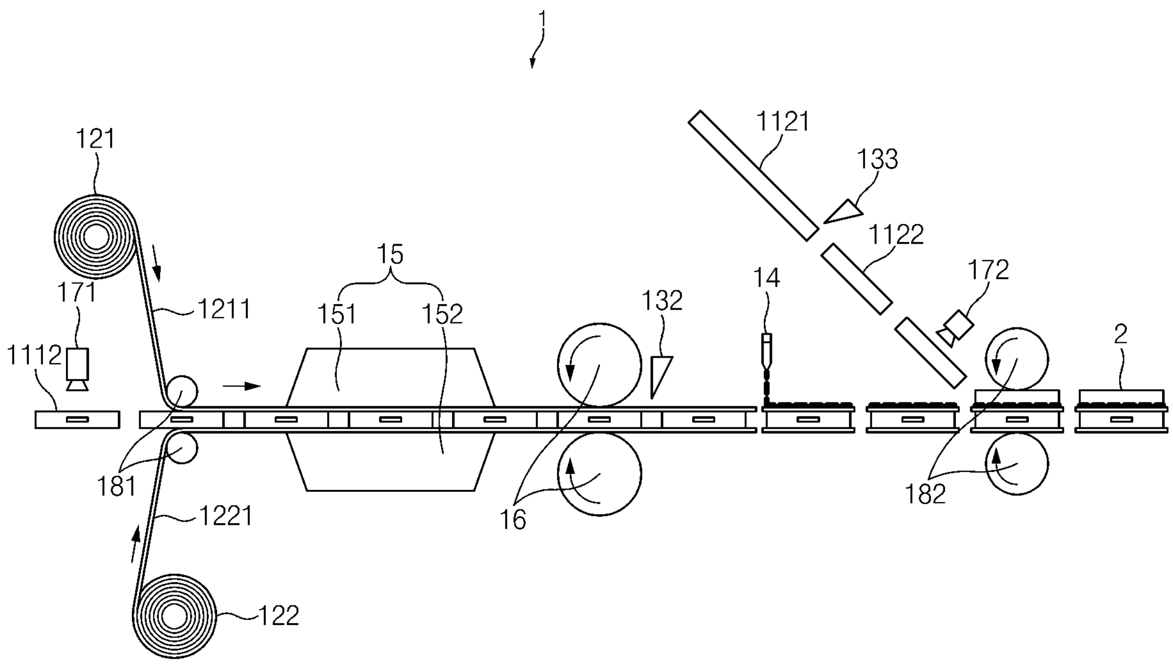
FIG. 3 is a schematic side view illustrating in detail the apparatus for preparing a unit cell according to the embodiment of the present invention.

FIG. 3 is a schematic side view illustrating in detail the apparatus 1 for preparing a unit cell according to the embodiment of the present invention.

As illustrated in FIG. 3, the apparatus 1 for preparing a unit cell according to the embodiment of the present invention may further include a first vision sensor 171 disposed above the center electrode 1112 to photograph the center electrode 1112 before the center electrode 1112 is stacked with the separator sheets 1211 and 1221; and a second vision sensor 172 disposed above the upper electrode 1122 to photograph the upper electrode 1122 before the upper electrode 1122 is stacked with the stack 20.

The first and second vision sensors 171 and 172 acquire an image by photographing a specific region and receiving an image signal for the specific region. For this purpose, a vision sensor generally includes an imaging device such as a charge coupled device (CCD) or a complementary metal-oxide semiconductor (CMOS). Particularly, the first and second vision sensors 171 and 172 according to an embodiment of the present invention may acquire images by photographing the center electrode 1112 and the upper electrode 1122, respectively.

Although not shown in the drawings, the apparatus 1 for preparing a unit cell may further include a controller (not shown) which may determine whether the center electrode 1112 and the upper electrode 1122 are defective or not through the images of the center electrode 1112 and the upper electrode 1122. The controller may determine whether sizes and shapes of the center electrode 1112 and the upper electrode 1122 are defective or damaged or not by comparing the obtained images with previously stored images of the center electrode 1112 and the upper electrode 1122 of a good product.

When these first and second vision sensors 171 and 172 are used, the first vision sensor 171 disposed above the center electrode 1112 may photograph the center electrode 1112 before the center electrode 1112 and the separator sheets 1211 and 1221 are stacked to form the stack 20, and the second vision sensor 172 disposed above the upper electrode 1122 may photograph the upper electrode 1122 before stacking the upper electrode 1122 on the stack 20. That is, before the electrode 11 is stacked with the separator 12, whether only the electrode 11 is defective or not may be confirmed in advance.

Figure 4:
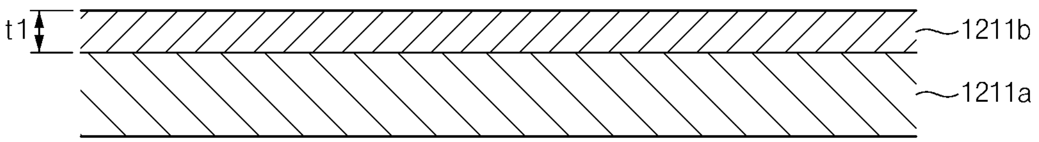
FIG. 4 is a cross-sectional view of an upper separator sheet according to an embodiment of the present invention.
Figure 5:
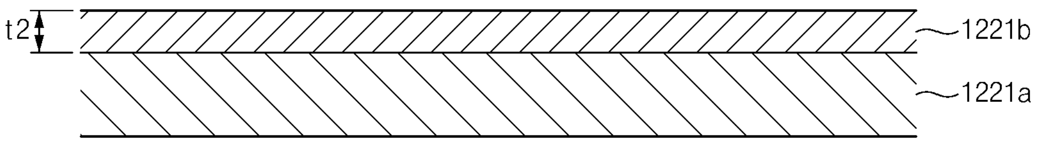
FIG. 5 is a cross-sectional view of a lower separator sheet according to an embodiment of the present invention.

FIG. 4 is a cross-sectional view of an upper separator sheet according to an embodiment of the present invention, and FIG. 5 is a cross-sectional view of a lower separator sheet according to an embodiment of the present invention.

The separator sheets 1211 and 1221 may include base material layers **1211*a* and 1221*a* and coating layers 1211*b* and 1221*b***, respectively.

The base material layers **1211*a* and 1221*a* are porous base materials, wherein the base material layers 1211*a* and 1221*a*** may include a polyethylene or polypropylene resin.

The coating layers **1211*b* and 1221*b* may be formed by respectively coating the base material layers 1211*a* and 1221*a* with a ceramic slurry including a filler and a binder. The coating layers 1211*b* and 1221*b*** may be ceramic coating layers. For example, the filler may include alumina (aluminum oxide), and the binder may include polyvinylidene fluoride (PVDF).

Specifically, the upper separator sheet 1211 may include the first base material layer **1211*a* and the first coating layer 1211*b* coated on an upper surface of the first base material layer 1211*a*, and the lower separator sheet 1221 may include the second base material layer 1221*a* and the second coating layer 1221*b* coated on an upper surface of the second base material layer 1221*a***.

Thus, the center electrode 1112 may be bonded to an upper surface of the second coating layer **1221*b* by the laminating process described above. The second coating layer 1221*b* may be a safety reinforced separator (SRS) coating layer. For example, an amount of the binder in the second coating layer 1221*b*** may be in a range of 10 wt % to 20 wt %.

Also, the nozzle 14 may apply an adhesive to an upper surface of the first coating layer **1211*b*, and the upper electrode 1122 may be bonded to the upper surface of the first coating layer 1211*b* by the adhesive. Thus, an amount of the binder in the first coating layer 1211*b* may be lower than the amount of the binder in the second coating layer 1221*b*. Specifically, the amount of the binder in the first coating layer 1211*b* may be less than half of the amount of the binder in the second coating layer 1221*b*. As a result, a thickness t1 of the first coating layer 1211*b* may be smaller than a thickness t2 of the second coating layer 1221*b***.

That is, since the amount of the binder in the first coating layer **1211*b* is decreased, a thickness of the upper separator sheet 1211 may be reduced and energy density of the unit cell 2** may be improved.

Specifically, the amount of the binder in the first coating layer **1211*b* may be in a range of 2 wt % to 3 wt %. Accordingly, bonding between the first coating layer 1211*b* and the first base material layer 1211*a* may be maintained while maintaining the thickness of the first coating layer 1211*b* as thin as possible. If the amount of the binder in the first coating layer 1211*b* is less than 2 wt %, there is a problem that the bonding between the first coating layer 1211*b* and the first base material layer 1211*a* is not maintained. Also, if the amount of the binder in the first coating layer 1211*b* is greater than 3 wt %, the thickness of the first coating layer 1211*b*** may be increased.

A configuration, in which the upper separator sheet 1211 does not include the first coating layer 1211*b*, is also possible. In this case, the nozzle 14 may apply an adhesive to the upper surface of the first base material layer 1211*a*, and a lower surface of the upper electrode 1122 may be bonded to the upper surface of the first base material layer 1211*a* by the adhesive.

Thus, there is an advantage that the thickness of the upper separator sheet 1211 becomes thinner. However, application of the configuration, in which the upper separator sheet 1211 does not include the first coating layer 1211*b*, when the upper electrode 1122 is a positive electrode is desirable in terms of stability.

Figure 6:
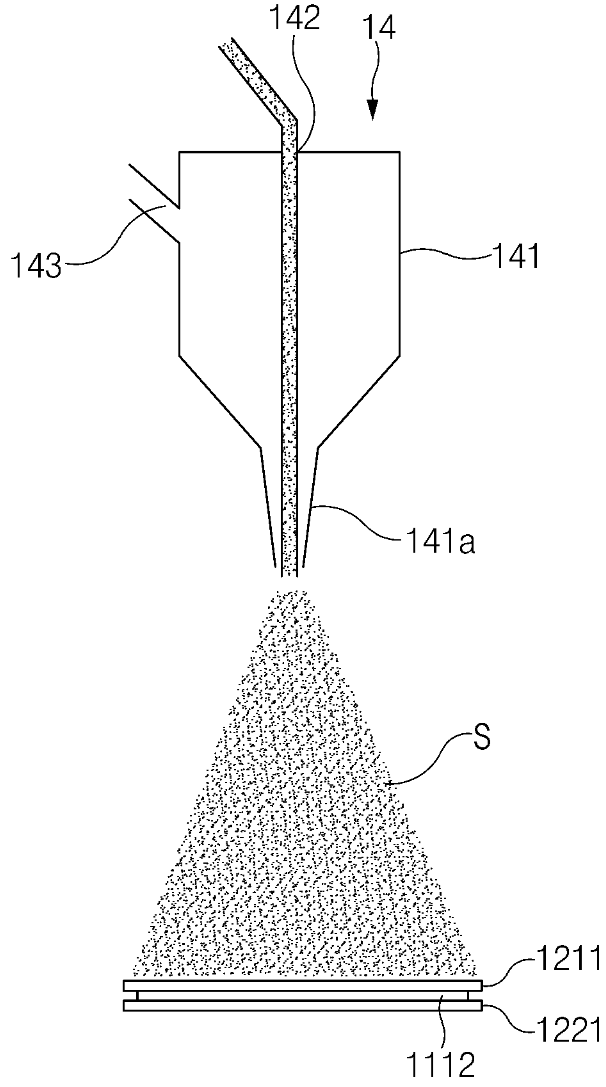
FIG. 6 is a view illustrating a nozzle according to an embodiment of the present invention.

FIG. 6 is a view illustrating a nozzle according to an embodiment of the present invention.

The nozzle 14 according to the present embodiment may spray an adhesive S in the form of a mist by spraying adhesive particles and compressed air together. Specifically, the nozzle 14 may include a housing 141 having an inner space, a tube 142 for supplying the adhesive S to the inside of the housing 141, and a line 143 for supplying the compressed air to the inside of the housing 141.

Also, a spraying portion 141*a* for spraying the adhesive S and the compressed air together toward the upper separator sheet 1211 of the stack 20 may be formed at a lower end of the housing 141.

That is, when the adhesive S supplied to the housing 141 through the tube 142 is discharged to the spraying portion 141*a*, the compressed air is injected into the housing 141 from the line 143 so that the adhesive S may be discharged through the spraying portion 141*a* together with the compressed air.

In a process of being discharged with the compressed air, the adhesive S becomes a mist while the adhesive particles are split by the compressed air, and, in that state, the adhesive S may be applied to the upper surface of the upper separator sheet 1211, more particularly, the first coating layer 1211*b*.

Since the adhesive S applied by such a spraying method may be applied in the form of small particles by a predetermined amount at a predetermined position, the adhesive S may be uniformly applied to the upper surface of the first coating layer 1211*b* of the upper separator sheet 1211 and may penetrates evenly throughout a region where the adhesive has been applied, and thus, optimum adhesion may be provided without wasting the adhesive S.

However, a configuration of the nozzle 14 is not limited thereto, and it is, of course, possible to adopt an inkjet spraying method (see FIG. 10) to be described later.

Figure 7:
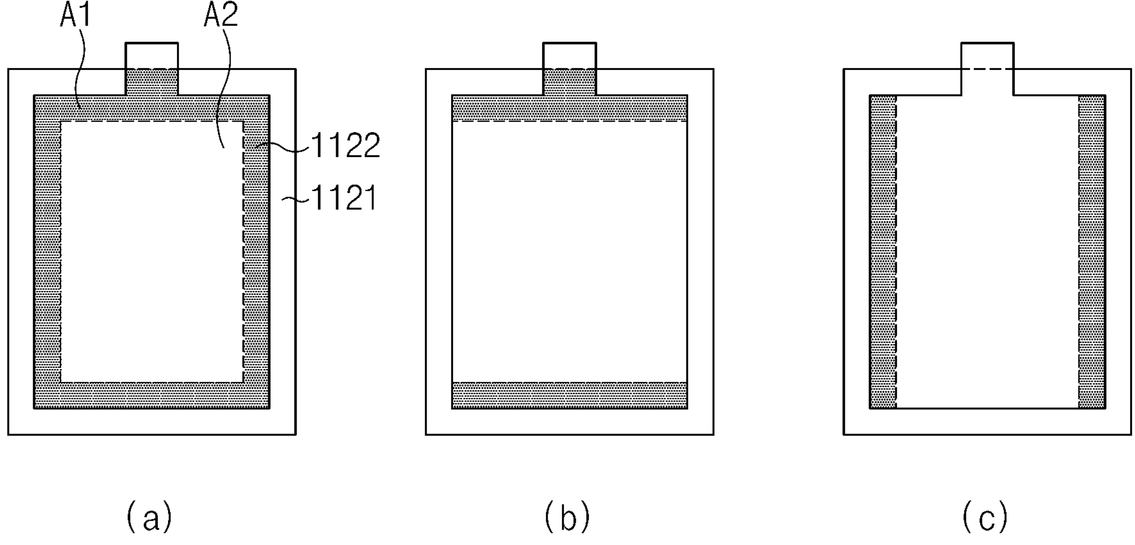
FIG. 7 is views illustrating adhesive regions between an upper electrode and an upper separator sheet of FIG. 3 by an adhesive.
Figure 7:
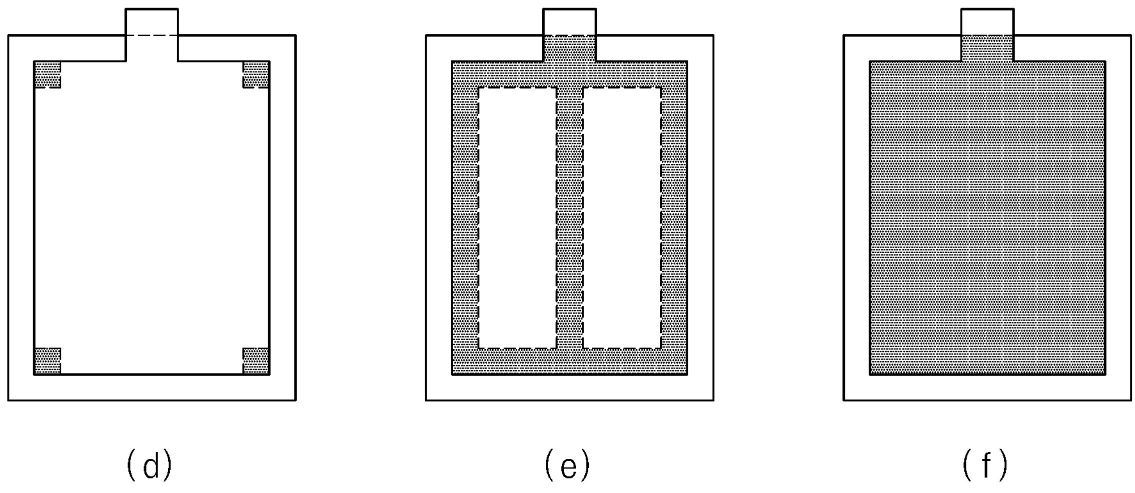

FIG. 7 is views illustrating adhesive regions between the upper separator sheet and the upper electrode of FIG. 3 by the adhesive.

The upper electrode 1122 may have a rectangular shape having a relatively short pair of short sides and a relatively long pair of long sides. The upper electrode 1122 may be stacked on the upper separator sheet 1211 so that the long side is parallel to the width direction of the upper separator sheet 1211.

An adhesive region A1 bonded to each other by the adhesive may be positioned between the upper electrode 1122 and the upper separator sheet 1211. That is, the adhesive region A1 may mean a region in which the nozzle 14 applies the adhesive on the upper surface of the upper separator sheet 1211.

As a first example, as illustrated in (a) of FIG. 7, the adhesive region A1 may extend along a circumference of the upper electrode 1122. In this case, the adhesive region A may have a rectangular ring shape, and may surround a non-adhesive region A2.

Thus, an edge portion of the lower surface of the upper electrode 1122 may be adhered to the upper separator sheet 1211. Also, the adhesive region A may protrude to correspond to an electrode tab protruding from the upper electrode 1122.

As a second example, as illustrated in (b) of FIG. 7, the adhesive region A1 may extend along both short sides of the upper electrode 1122. Thus, portions of the lower surface of the upper electrode 1122 adjacent to the both short sides may be adhered to the upper separator sheet 1211. In this case, the non-adhesive region A2 may include regions adjacent to both long sides of the lower surface of the upper electrode 1122. Also, the adhesive region A may protrude to correspond to an electrode tab protruding from the upper electrode 1122.

As a third example, as illustrated in (c) of FIG. 7, the adhesive region A1 may extend along both long sides of the upper electrode 1122. Thus, portions of the lower surface of the upper electrode 1122 adjacent to the both long sides may be adhered to the upper separator sheet 1211. In this case, the non-adhesive region A2 may include regions adjacent to both short sides of the lower surface of the upper electrode 1122.

As in the first to third examples, in the step of applying the adhesive to the upper surface of the stack 20, a region to which the adhesive is applied may correspond to at least a portion of the edge of the upper electrode 1122.

As a fourth example, as illustrated in (d) of FIG. 7, the adhesive region A1 may be located in regions corresponding to four vertices of the upper electrode 1122. Thus, portions adjacent to the four vertices of the lower surface of the upper electrode 1122 may be adhered to the upper separator sheet 1211. In this case, the non-adhesive region A2 may include a portion of regions adjacent to both long sides of the lower surface of the upper electrode 1122 and a portion of regions adjacent to both short sides thereof.

With respect to the first to fourth examples, the adhesive region A may additionally include a region (not shown) corresponding to a center of the upper electrode 1122. As a fifth example, as illustrated in (e) of FIG. 7, the adhesive region A1 may include a first region extending along the circumference of the upper electrode 1122 and a second region extending parallel to the short side or the long side of the upper electrode 1122 and passing through the center of the upper electrode 1122 in addition to the first region. Thus, more robust adhesion than that of the first example is possible.

The adhesive region A1 may surround the non-adhesive region A2. A plurality of non-adhesive regions A2, which are partitioned from each other by the second region of the adhesive region A1, may be formed. Also, the adhesive region A1 may protrude to correspond to an electrode tab protruding from the upper electrode 1122.

With respect to the first to fifth examples, an area of the adhesive region A1 may be smaller than an area of the non-adhesive region A2. As a sixth example, as illustrated in (f) of FIG. 7, the adhesive region A1 may have a shape corresponding to the upper electrode 1122. Thus, the entire lower surface of the upper electrode 1122 may be adhered to the upper separator sheet 1211. In this case, the non-adhesive region A2 does not exist.

As in the first to sixth examples, in the step of applying the adhesive to the upper surface of the stack 20, the region to which the adhesive is applied may include regions corresponding to the four vertices of the upper electrode 1122.

Figure 8:
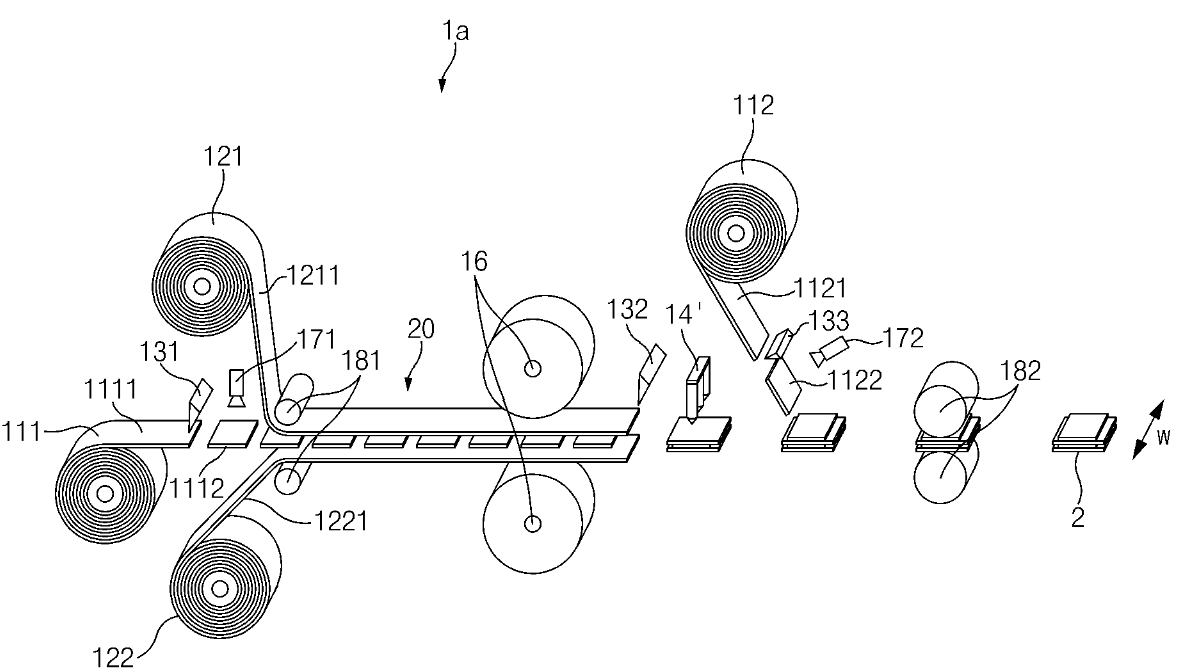
FIG. 8 is a schematic view of an apparatus for preparing a unit cell according to another embodiment of the present invention.
Figure 9:
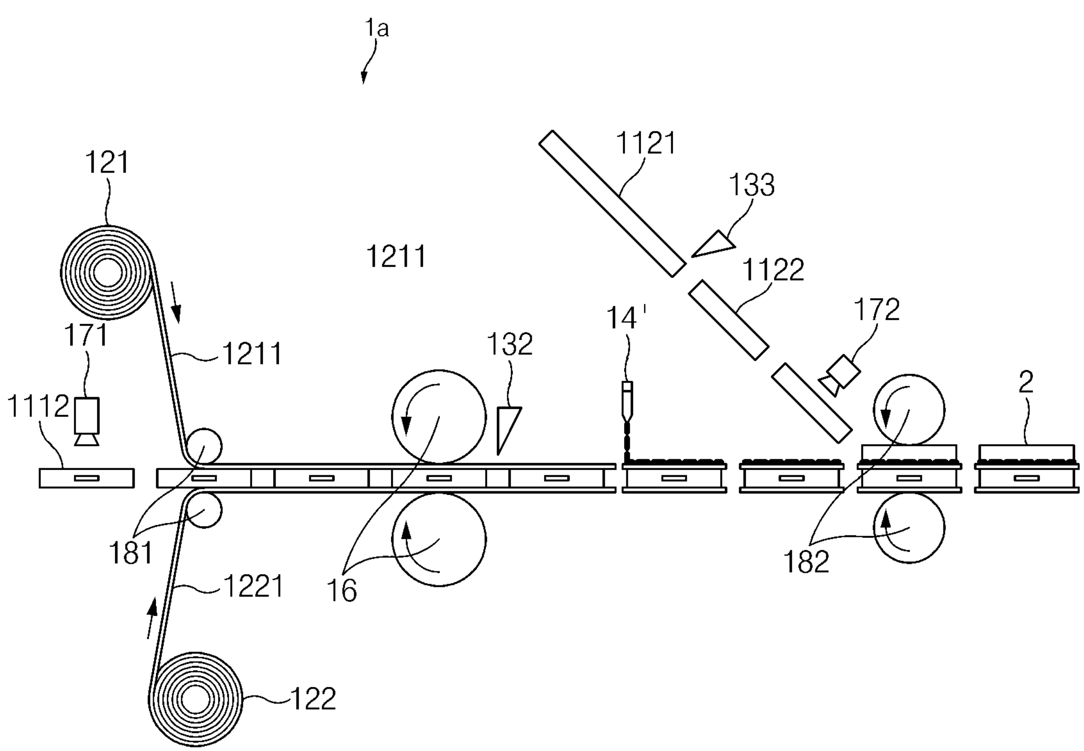
FIG. 9 is a schematic side view illustrating in detail the apparatus for preparing a unit cell according to the another embodiment of the present invention.

FIG. 8 is a schematic view of an apparatus 1*a* for preparing a unit cell according to another embodiment of the present invention, and FIG. 9 is a schematic side view illustrating in detail the apparatus 1*a* for preparing a unit cell according to the another embodiment of the present invention.

According to embodiments of the present invention, a laminating process is first performed on the stack 20, which is formed by stacking the center electrode 1112 and the separator 12, and the upper electrode 1122 is then stacked. As a result, since heat is transferred to the inside of the stack 20 in the laminating process, a problem of reducing the adhesion between the electrode 11 and the separator 12 may be prevented. Thus, there is no need to apply excessive heat and pressure to the stack 20 in the laminating process.

Therefore, in the apparatus 1*a* for preparing a unit cell according to the another embodiment of the present invention, as illustrated in FIGS. 8 and 9, the heater 15 is removed from the laminator, and only the heating roller 16 laminates the stack 20. In general, since the heating roller 16 may apply a higher pressure to the stack 20 than the heater 15, the heating roller 16 alone may sufficiently laminate the stack 20.

As described above, since the heater 15 is removed from the laminator, complication of the apparatus 1*a* for preparing a unit cell may be prevented, an overall volume may be reduced, and costs may be reduced. However, in order to prevent the inside of the stack 20 from being damaged due to rapid changes in temperature and pressure, the heating roller 16 must be adjusted so that the heat and pressure applied to the stack 20 are not excessively large.

Figure 10:
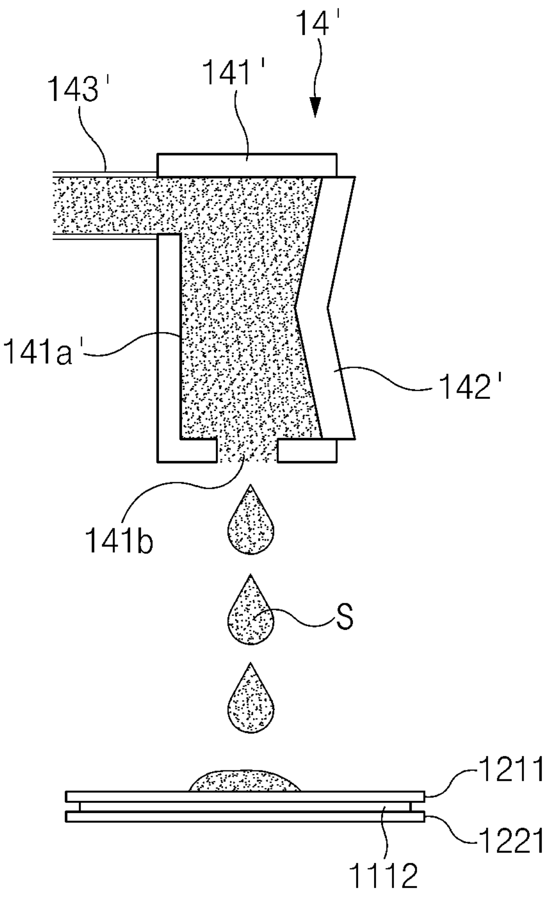
FIG. 10 is a view illustrating a nozzle according to another embodiment of the present invention.

FIG. 10 is a view illustrating a nozzle according to another embodiment of the present invention.

The nozzle 14' according to the present embodiment may inkjet spray an adhesive S in the form of fine droplets by a pressure change in a pressure chamber 141*a*'. Specifically, the nozzle 14' may include a housing 141' having the pressure chamber 141*a*', a wall 142' which is provided on one side of the housing 141' and moves to cause a change in volume of the pressure chamber 141*a*, and a tube 143' for supplying the adhesive S to the pressure chamber 141*a'*.

Also, a discharge port 141*b* through which the adhesive S is discharged toward the upper separator sheet 1211 of the stack 20 may be formed at a lower end of the housing 141'.

The adhesive S, in a state in which it is filled in the pressure chamber 141*a*', is not discharged through the discharge port 141*b* due to viscosity of the adhesive S. In this state, if the wall 142' moves in a direction of reducing the volume of the pressure chamber 141*a*', an internal pressure of the pressure chamber 141*a*' increases, and the adhesive S is discharged to the outside through the discharge port 141*b* to be applied to the upper surface of the upper separator sheet 1211. In addition, when the wall 142' is restored to its original state, the discharge of the adhesive S is stopped.

Since the adhesive S applied by such an inkjet spraying method may be applied in the form of small particles by a predetermined amount at a predetermined position, the adhesive S may be uniformly applied to the upper surface of the first coating layer 1211*b* of the upper separator sheet 1211 and may penetrates evenly throughout a region where the adhesive has been applied, and thus, optimum adhesion may be provided without wasting the adhesive S.

However, a configuration of the nozzle 14' is not limited thereto, and it is, of course, possible to adopt the previously described spraying method (see FIG. 6).

Figure 11:
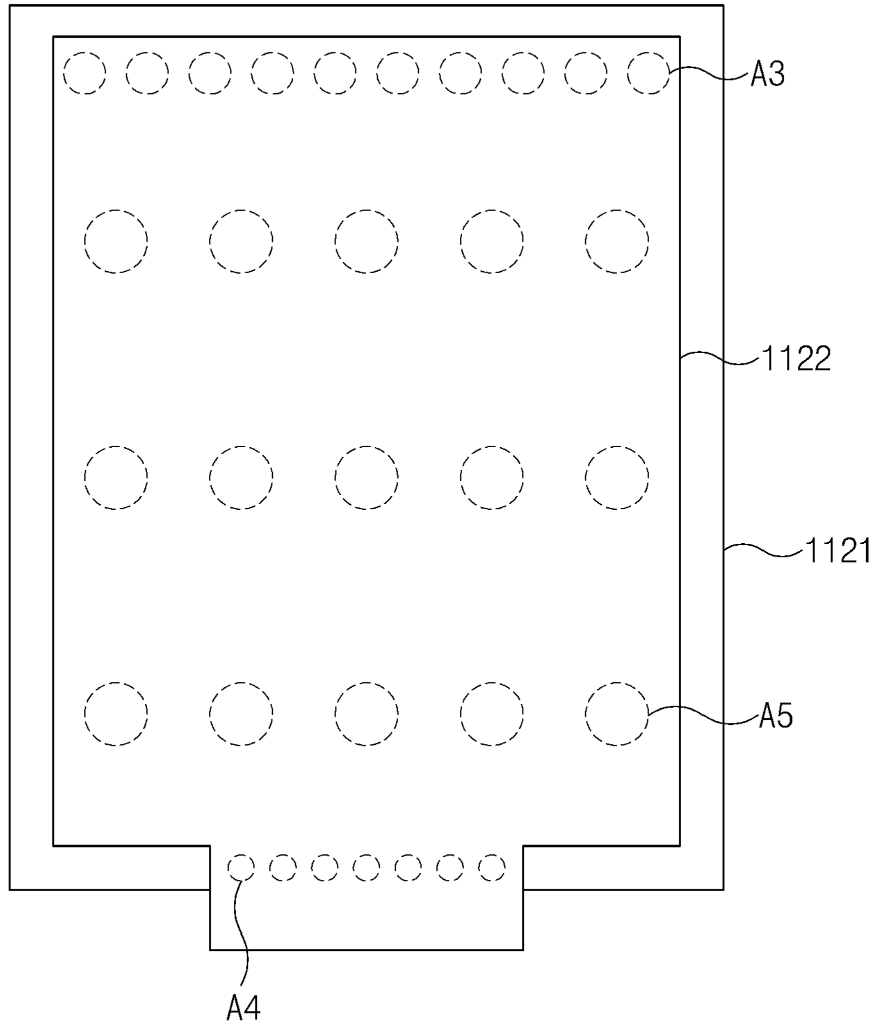
FIG. 11 is a view illustrating adhesive regions between an upper electrode and an upper separator sheet of FIG. 9 by an adhesive.

FIG. 11 is a view illustrating adhesive regions between the upper electrode and the upper separator sheet of FIG. 9 by the adhesive.

Adhesive regions A3, A4, and A5, which are adhered to each other by the adhesive, may be located between the upper electrode 1122 and the upper separator sheet 1211. With respect to the present embodiment, the adhesive regions A3, A4, and A5 may be disposed along a plurality of rows parallel to a movement direction of the upper separator sheet 1211. Each of the adhesive regions A3, A4, and A5 may be formed by spot application of the adhesive. Thus, the plurality of adhesive regions A3, A4, and A5 located in the same row may be spaced apart from each other with respect to the movement direction of the upper separator sheet 1211.

That is, in the step of applying the adhesive to the upper surface of the stack 20, the region to which the adhesive is applied may form a plurality of rows parallel to a movement direction of the stack 20.

Specifically, the adhesive regions A3, A4, and A5 may include a plurality of first adhesive regions A3 forming a row adjacent to the short side of the upper electrode 1122, a plurality of second adhesive regions A4 forming a row corresponding to the electrode tab of the upper electrode 1122, and a plurality of third adhesive regions A5 forming a row located inside the first adhesive regions A3 and the second adhesive regions A4.

In addition, a spacing between the adhesive-applied regions in a specific row may be different from a spacing between the adhesive-applied regions in another row by controlling spraying cycles of the plurality of nozzles 14' differently.

For example, the adhesive may be sprayed more densely to regions corresponding to the electrode tab of the upper electrode 1122 and the edge of the upper electrode 1122 which require great adhesion. Specifically, a spacing between the plurality of first adhesive regions A3 may be greater than a spacing between the plurality of second adhesive regions A4 and may be smaller than a spacing between the plurality of third adhesive regions A5.

Also, areas of the regions to which the adhesive is applied in a specific row may be formed to be greater than areas of the regions to which the adhesive is applied in another row by controlling spraying amounts or spraying areas of the plurality of nozzles 14' differently.

For example, the adhesive may be sprayed more widely in a region corresponding to the center of the upper electrode 1122 where there is no risk of leakage of the adhesive. Specifically, a size of each first adhesive region A3 may be greater than a size of each second adhesive region A4 and may be smaller than a size of each third adhesive region A5.

Figure 12:
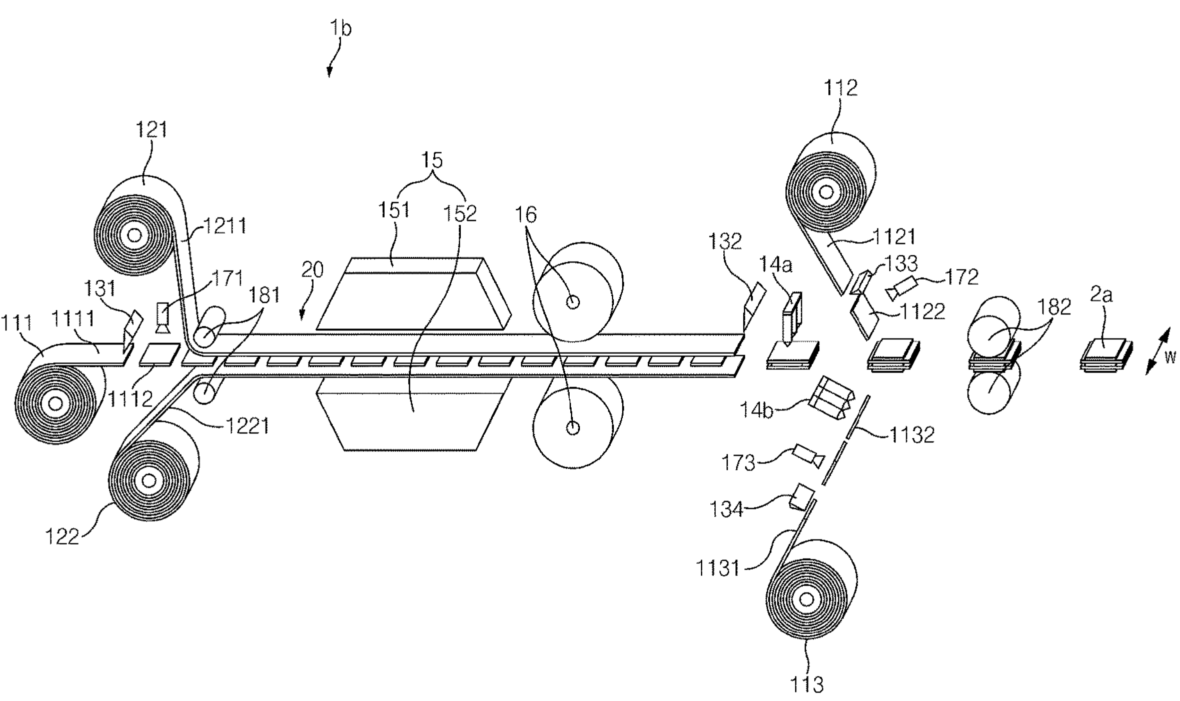
FIG. 12 is a schematic view of an apparatus for preparing a unit cell according to another embodiment of the present invention.

FIG. 12 is a schematic view of an apparatus 1*b* for preparing a unit cell according to another embodiment of the present invention.

As described above, an electrode assembly is classified into various types. For example, there are a simple stack type, a lamination & stack type (L&S), a stack & folding type (S&F), and a Z-folding type.

According to an embodiment and another embodiment of the present invention, the unit cell 2 is prepared in which the separator 12, the electrode 11, the separator 12, and the electrode 11 are sequentially stacked. Thus, the electrode 11 is formed on one surface of the unit cell 2 and the separator 12 is formed on the other surface thereof. These unit cells 2 are mainly used when a lamination & stack type electrode assembly is prepared. However, when a stack & folding type or Z-folding type electrode assembly is prepared, a unit cell 2*a* having the electrodes 11 formed on both surfaces thereof is mainly used.

The apparatus 1*b* for preparing a unit cell according to the another embodiment of the present invention, as illustrated in FIG. 12, further includes a lower electrode reel 113 from which a lower electrode sheet 1131, which is to be a plurality of lower electrodes 1132 to be stacked on a lower surface of the stack 20, is unwound.

The lower electrode reel 113 is a reel on which the lower electrode sheet 1131 is wound, and the lower electrode sheet 1131 is unwound from the lower electrode reel 113 and the lower electrode sheet 1131 is cut to form the plurality of lower electrodes 1132. In addition, when a first nozzle 14*a* applies an adhesive to the upper surface of the cut stack 20, a second nozzle 14*b* may also apply an adhesive to an upper surface of the lower electrode 1132. The lower electrode 1132 to which the adhesive is applied is stacked on the lower surface of the stack 20. In this case, the plurality of lower electrodes 1132 may be stacked on the lower surface of the stack 20 while being spaced apart from each other and disposed in a row in a length direction of the separator sheets 1211 and 1221. The upper electrode 1122, the center electrode 1112, and the lower electrode 1132 may have different spacings apart from each other, but, since the electrodes 11 with the same polarity have the same size, it is desirable that the spacings are always constant. Thus, if the upper electrode 1122 and the lower electrode 1132 are the electrodes 11 with the same polarity, spacings apart from the separator sheets 1211 and 1221 may be constant. In addition, it is desirable that the upper electrode 1122, the center electrode 1112, and the lower electrode 1132 are all aligned and disposed so that centers thereof coincide.

When a laminating process of the stack 20 is completed, the second cutter 132 cuts the stack 20 at a predetermined interval, and the first nozzle 14*a* applies the adhesive to the upper surface of the cut stack 20 (S104). When the upper electrode sheet 1121 is unwound from the upper electrode reel 112, the third cutter 133 cuts the upper electrode sheet 1121 to form the upper electrode 1122. In addition, when the lower electrode sheet 1131 is unwound from the lower electrode reel 113, a fourth cutter 134 cuts the lower electrode sheet 1131 to form the lower electrode 1132. Then, the second nozzle 14*b* applies the adhesive to the upper surface of the lower electrode 1132.

The upper electrode 1122 is stacked on the upper surface of the stack 20 to which the adhesive has been applied, and the lower electrode 1132 to which the adhesive has been applied is stacked on the lower surface of the stack 20. As a result, the unit cell 2*b* is prepared in which the lower electrode 1132, the lower separator sheet 1221, the center electrode 1112, the upper separator sheet 1211, and the upper electrode 1122 are sequentially stacked.

Figure 13:
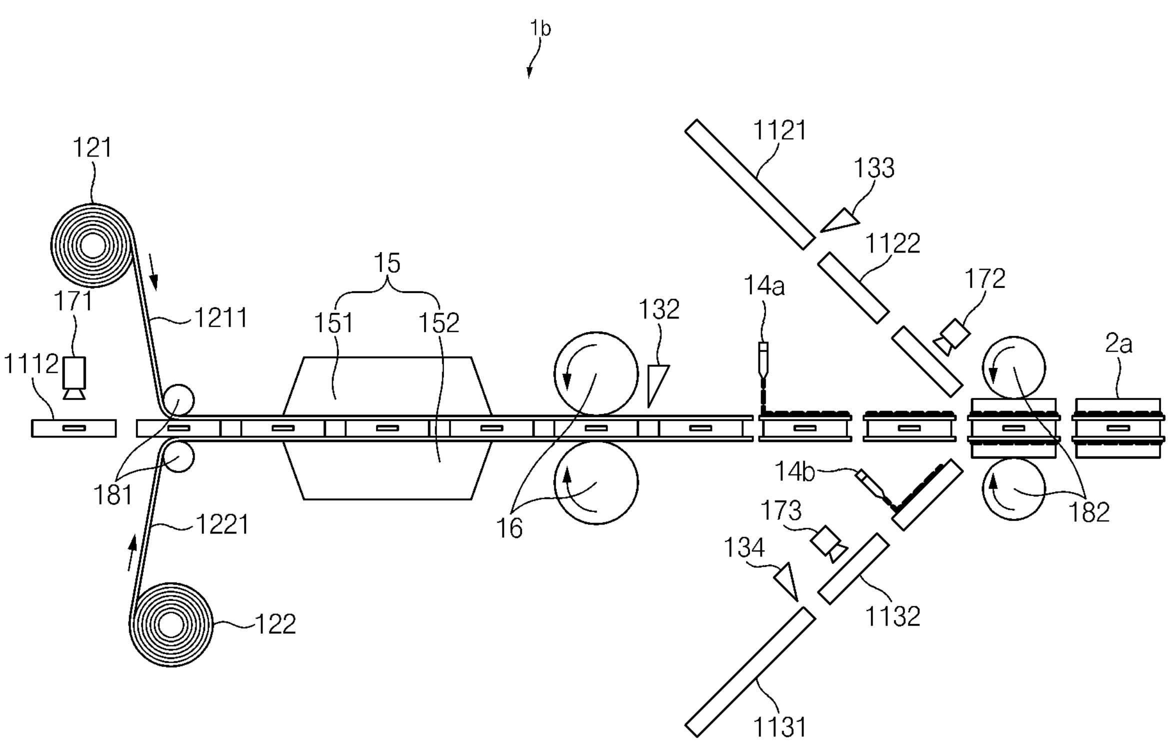
FIG. 13 is a schematic side view illustrating in detail the apparatus for preparing a unit cell according to the another embodiment of the present invention.

FIG. 13 is a schematic side view illustrating in detail the apparatus 1*b* for preparing a unit cell according to the another embodiment of the present invention.

The apparatus 1*b* for preparing a unit cell according to the another embodiment of the present invention may further include a third vision sensor 173 disposed above the lower electrode 1132 to photograph the lower electrode 1132 before the lower electrode 1132 is stacked with the stack 20, particularly, before the second nozzle 14*b* applies the adhesive on the upper surface of the lower electrode 1132. That is, the third vision sensor 173 may acquire an image by photographing the lower electrode 1132. As a result, the third vision sensor 173 may determine whether size and shape of the lower electrode 1132 are defective or damaged or not, before the lower electrode 1132 is stacked with the stack 20.

It will be understood by those of ordinary skill in the art that various changes in form and details may be made therein without departing from the spirit and scope of the invention as defined by the following claims. Accordingly, it is to be understood that the invention has been described by way of illustration and not limitation. Thus, the scope of the invention is defined by the following claims rather than the foregoing detailed description, and it is to be interpreted that all changes or modifications derived from the meaning, scope and equivalent concept of the appended claims are within the scope of the present invention.

DESCRIPTION OF THE SYMBOLS

1: Unit Cell Preparation Apparatus
2: Unit Cell
11: Electrode
12: Separator
14, 14': Nozzle
15: Heater
16: Heating Roller
20: Stack
111: Center Electrode Reel
112: Upper Electrode Reel
113: Lower Electrode Reel
121: Upper Separator Reel
122: Lower Separator Reel
131: First Cutter
132: Second Cutter
133: Third Cutter
134: Fourth Cutter
14*a*: First Nozzle
14*b*: Second Nozzle
141, 141': Housing
141*a*: Spraying Portion
141*a*': Pressure Chamber
141*b*: Discharge Port
142: Tube
142': Wall
143: Line
143': Tube
151: Upper Heater
152: Lower Heater
171: First Vision Sensor
172: Second Vision Sensor
173: Third Vision Sensor
181: First Nip Roll
182: Second Nip Roll
1111: Center Electrode Sheet
1121: Upper Electrode Sheet
1131: Lower Electrode Sheet
1112: Center Electrode
1122: Upper Electrode
1132: Lower Electrode
1211: Upper Separator Sheet
1221: Lower Separator Sheet
A1: Adhesive Region
A2: Non-adhesive Region
A3: A Plurality of First Adhesive Regions
A4: A Plurality of Second Adhesive Regions
A5: A Plurality of Third Adhesive Regions
S: Adhesive
T1: Thickness of First Coating Layer
T2: Thickness of Second Coating Layer

The invention claimed is:

1. An apparatus for preparing a unit cell, the apparatus comprising:

a center electrode reel from which a center electrode sheet is unwound, wherein the center electrode sheet is configured to form a plurality of center electrodes;

separator reels from which separator sheets to be stacked with the center electrodes are unwound;

a laminator including a heating roller and a heater configured to apply heat and pressure to laminate a stack which is formed by stacking the plurality of center electrodes with the separator sheets while the plurality of center electrodes are spaced apart from each other and disposed in a row in a longitudinal direction of the separator sheets;

a first nozzle configured to apply an adhesive to an upper surface of a separator sheet disposed on an uppermost layer of the laminated stack; and an upper electrode reel from which an upper electrode sheet is unwound, wherein the upper electrode sheet is configured to form a plurality of upper electrodes configured to be stacked on an upper surface of the laminated stack to which the adhesive has been applied, wherein the heat and pressure applied by the heating roller is greater than the heat and pressure applied by the heater.

2. The apparatus for preparing the unit cell of claim 1, further comprising:

a first vision sensor disposed above a center electrode of the plurality of center electrodes configured to photograph the center electrode before the center electrodes are stacked with the separator sheets.

3. The apparatus for preparing the unit cell of claim 2, further comprising:

a second vision sensor disposed above an upper electrode of the plurality of upper electrodes configured to photograph the upper electrode before the upper electrode is stacked with the stack.

4. The apparatus for preparing the unit cell of claim 1, wherein the separator reels comprise an upper separator reel from which an upper separator sheet to be stacked on an upper surface of a center electrode of the plurality of center electrodes is unwound; and a lower separator reel from which a lower separator sheet to be stacked on a lower surface of the center electrode is unwound.

5. The apparatus for preparing the unit cell of claim 1, further comprising:

a lower electrode reel from which a lower electrode sheet is unwound, wherein the lower electrode sheet is configured to form a plurality of lower electrodes to be stacked on a lower surface of the stack.

6. The apparatus for preparing the unit cell of claim 5, further comprising:

a second nozzle configured to apply an adhesive to an upper surface of a lower electrode of the plurality of lower electrodes.

7. The apparatus for preparing the unit cell of claim 6, further comprising:

a third vision sensor disposed above the lower electrode configured to photograph the lower electrode before the lower electrode is stacked with the stack.

8. The apparatus for preparing the unit cell of claim 1, further comprising:

nip rollers configured to apply pressure to the upper electrode and the laminated stack while rotating when the upper electrode is stacked with the laminated stack.

9. The apparatus for preparing the unit cell of claim 1, wherein the first nozzle includes a plurality of first nozzles spaced apart from each other in a width direction of the separator sheets.

10. The apparatus for preparing the unit cell of claim 9, wherein at least one of a spraying cycle, a spraying area, and a spraying amount of the adhesive for each first nozzle of the plurality of first nozzles is different from each of the other first nozzles.

11. The apparatus for preparing the unit cell of claim 4, wherein the upper separator sheet comprises:

a first base material layer; and a first coating layer coated on an upper surface of the first base material layer and configured to be bonded to the upper electrode by the adhesive, wherein the lower separator sheet comprises:

a second base material layer; and a second coating layer coated on an upper surface of the second base material layer and configured to be bonded to the center electrode, wherein the first binder content of the first coating layer is lower than the second binder content of the second coating layer.

12. The apparatus for preparing the unit cell of claim 11, wherein the binder content of the first coating layer is in a range of 2 to 3 wt % of a weight of the first coating layer.

13. The apparatus for preparing the unit cell of claim 11, wherein the binder content of the second coating layer is in a range of 10 to 20 wt % of a weight of the second coating layer.

14. The apparatus for preparing the unit cell of claim 4, wherein the upper separator sheet comprises:

a first base material layer configured to be bonded to the upper electrode by the adhesive, wherein the lower separator sheet comprises:

a second base material layer; and a coating layer coated on an upper surface of the second base material layer and bonded to the center electrode.

15. A method of preparing a unit cell, the method comprising:

cutting a center electrode sheet unwound from a center electrode reel to form a plurality of center electrodes;

forming a stack by stacking the plurality of center electrodes on separator sheets unwound from separator reels while the plurality of center electrodes are spaced apart from each other and disposed in a row in a longitudinal direction of the separator sheets;

laminating the stack with a laminator including a heating roller and a heater to apply heat and pressure to laminate a stack;

applying an adhesive by a first nozzle on an upper surface of a separator sheet disposed on an uppermost layer of the stack;

cutting an upper electrode sheet unwound from an upper electrode reel to form a plurality of upper electrodes; and stacking the plurality of upper electrodes on an upper surface of the laminated stack to which the adhesive has been applied, wherein the heat and pressure applied by the heating roller is greater than the heat and pressure applied by the heater.

16. The method of claim 15, further comprising:

photographing the center electrode with a first vision sensor disposed above the center electrode, before the forming of the stack.

17. The method of claim 16, further comprising:
photographing the upper electrode with a second vision sensor disposed above the upper electrode, before the stacking of the upper electrode.

18. The method of claim 15, wherein the stacking of the upper electrode is performed by stacking the plurality of upper electrodes on the upper surface of the stack while the plurality of upper electrodes are spaced apart from each other and disposed in a raw in a length direction of the separator sheet.

19. The method of claim 15, wherein the laminating comprises applying heat and pressure to the stack by the heating roller while the heating roller rotates.

20. The method of claim 19, wherein the laminating further comprises applying heat and pressure to an entire surface of the stack by the heater, before the heating roller applies the heat and the pressure.

21. The method of claim 15, wherein the forming of the upper electrode further comprises
forming a plurality of lower electrodes by cutting a lower electrode sheet unwound from a lower electrode reel is also performed, and
wherein the stacking of the upper electrode comprises
stacking the plurality of lower electrodes on a lower surface of the stack is also performed.

22. The method of claim 21, wherein the applying of the adhesive on the upper surface of the stack comprises applying an adhesive on an upper surface of the lower electrode by a second nozzle is also performed.

23. The method of claim 15, wherein the applying of the adhesive on the upper surface of the stack comprises a region to which the adhesive is applied configured to correspond to at least a portion of an edge of the upper electrode.

24. The method of claim 15, wherein the applying of the adhesive on the upper surface of the stack comprises a region to which the adhesive is applied including regions corresponding to four vertices of the upper electrode.

25. The method of claim 15, wherein the applying of the adhesive on the upper surface of the stack comprises
a region to which the adhesive is applied configured to form a plurality of rows parallel to a movement direction of the stack.

26. The method of claim 25, wherein a spacing between the regions to which the adhesive is applied in one row is smaller than a spacing between the regions to which the adhesive is applied in another row.

27. The method of claim 25, wherein a size of each region to which the adhesive is applied in one row is smaller than a size of each region to which the adhesive is applied in another row.

28. The method of claim 26, wherein the one row is located outer side than the other row with respect to a width direction of the stack.

29. The method of claim 26, wherein the one row corresponds to an electrode tab of the upper electrode.

30. The method of claim 27, wherein the one row is located outer side than the other row with respect to a width direction of the stack.

31. The method of claim 27, wherein the one row corresponds to an electrode tab of the upper electrode.

* * * * *